US006940827B2

(12) United States Patent
Li et al.

(10) Patent No.: US 6,940,827 B2
(45) Date of Patent: Sep. 6, 2005

(54) COMMUNICATION SYSTEM USING OFDM FOR ONE DIRECTION AND DSSS FOR ANOTHER DIRECTION

(75) Inventors: Xiaodong Li, Bellevue, WA (US); Hui Liu, Sammamish, WA (US); Wenzhong Zhang, Bellevue, WA (US)

(73) Assignee: Adaptix, Inc., Bothell, WA (US)

( * ) Notice: Subject to any disclaimer, the term of this patent is extended or adjusted under 35 U.S.C. 154(b) by 799 days.

(21) Appl. No.: 09/802,453

(22) Filed: Mar. 9, 2001

(65) Prior Publication Data

US 2002/0159422 A1 Oct. 31, 2002

(51) Int. Cl.[7] .............................................. H04B 7/005
(52) U.S. Cl. ...................................... 370/278; 370/282
(58) Field of Search ................................ 370/203, 204, 370/208, 210, 278, 279, 282, 320, 335, 343, 441, 465; 375/140, 142, 143

(56) References Cited

U.S. PATENT DOCUMENTS

| 5,434,572 A | * | 7/1995 | Smith .......................... 342/44 |
| 5,479,447 A | | 12/1995 | Chow et al. |
| 5,504,775 A | | 4/1996 | Chouly et al. |
| 5,515,378 A | | 5/1996 | Roy, III et al. |
| 5,555,268 A | | 9/1996 | Fattouche et al. |
| 5,640,413 A | * | 6/1997 | Ichihara ...................... 375/130 |
| 5,708,973 A | | 1/1998 | Ritter |
| 5,726,978 A | | 3/1998 | Frodigh et al. |
| 5,734,967 A | | 3/1998 | Kotzin et al. |
| 5,886,988 A | | 3/1999 | Yun et al. |
| 5,887,245 A | | 3/1999 | Lindroth et al. |
| 5,914,933 A | | 6/1999 | Cimini et al. |
| 5,933,421 A | | 8/1999 | Alamouti et al. |
| 5,956,642 A | | 9/1999 | Larsson et al. ............. 455/449 |
| 5,973,642 A | | 10/1999 | Li et al. ...................... 342/378 |
| 5,991,273 A | | 11/1999 | Abu-Dayya |
| 6,005,876 A | | 12/1999 | Cimini, Jr. et al. .......... 370/525 |
| 6,026,123 A | | 2/2000 | Williams |
| 6,041,237 A | | 3/2000 | Farsakh ...................... 455/450 |
| 6,052,594 A | | 4/2000 | Chuang et al. ............. 455/450 |
| 6,061,568 A | | 5/2000 | Dent |

(Continued)

FOREIGN PATENT DOCUMENTS

| DE | 198 00 953 C1 | 7/1999 |
| EP | 0 869 647 A2 | 10/1998 |
| EP | 0 926 912 A2 | 6/1999 |
| EP | 0 929 202 A1 | 7/1999 |
| FR | 2 777 407 A1 | 10/1999 |
| GB | 2 209 858 A | 8/1997 |
| JP | 06029922 | 2/1994 |
| WO | WO 98/16077 A2 | 4/1998 |
| WO | WO 98/30047 A1 | 7/1998 |
| WO | WO 02 49305 A2 | 6/2002 |

OTHER PUBLICATIONS

Wong, C.Y., et al., *Multiuser OFDM With Adaptive Subcarrier, Bit, and Power Allocation*, IEEE Journal on Selected Areas in Communications, Oct. 1999, IEEE Inc., New York, USA, vol. 17, Nr. 10, pp. 1747–1758, XP000854075, ISSN: 0733–8716 Sections I and II abstract.

Gruenheid, R. et al: "Adaptive Modulation and Multiple Access for the OFDM Transmission Technique", Wireless Personal Communications, Kluwer Academic Publishers, NL, vol. 13, NR. 1/2, Year 2000, pp. 5–13 XP000894156, ISSN: 0929–6212.

(Continued)

*Primary Examiner*—Duc Ho
*Assistant Examiner*—Thien Tran
(74) *Attorney, Agent, or Firm*—Fulbright & Jaworski LLP

(57) ABSTRACT

A method and apparatus for wireless communication are described. In one embodiment, a method for communicating with a subscriber comprises transmitting orthogonal frequency domain multiplexing (OFDM) signals to the subscriber, and receiving direct-sequence spread spectrum (DSSS) signals from the subscriber.

54 Claims, 11 Drawing Sheets

U.S. PATENT DOCUMENTS

| | | | |
|---|---|---|---|
| 6,064,692 A | 5/2000 | Chow | 375/219 |
| 6,064,694 A | 5/2000 | Clark et al. | 375/224 |
| 6,067,290 A | 5/2000 | Paulraj et al. | 370/329 |
| 6,084,871 A * | 7/2000 | Engstrom et al. | 370/350 |
| 6,108,374 A | 8/2000 | Balachandran et al. | |
| 6,131,016 A | 10/2000 | Greenstein et al. | |
| 6,144,696 A | 11/2000 | Shively et al. | |
| 6,226,320 B1 | 5/2001 | Hakkinen et al. | |
| 6,320,897 B1 * | 11/2001 | Fattouche et al. | 375/130 |
| 6,366,195 B1 | 4/2002 | Harel et al. | |
| 6,373,861 B1 * | 4/2002 | Lee | 370/503 |
| 6,377,632 B1 | 4/2002 | Paulraj et al. | |
| 6,449,630 B1 * | 9/2002 | Bao | 708/603 |
| 6,477,158 B1 | 11/2002 | Take | |
| 2003/0067890 A1 | 4/2003 | Goel et al. | |
| 2003/0169824 A1 | 9/2003 | Chayat | |

OTHER PUBLICATIONS

Motegi, M. et al.: "Optimum Band Allocation According to Subband Condition for BST-OFDM" 11th IEEE International Symposium on Personal Indoor and Mobile Radio Communications, vol. 2, Sep. 18–21, 2000, pp. 1236–1240, XP002213669, Piscataway, NJ, USA, ISBN: 0-7803-6463-5.

Kapoor, S. et al.: "Adaptive Interference Suppression in Multiuser Wireless OFDM Systems Using Antenna Arrays" IEEE Transactions on Signal Processing, vol. 47, No. 12, Dec. 1999, pp. 3381–3391, XP000935422, IEEE, New York, USA, ISSN: 1053-587X.

Ye Li, et al.: "Clustered OFDM with channel estimation for high rate wireless data", Mobile Multimedia Communications, 1999. (MOMUC '99). 1999 IEEE International Workshop on San Diego, CA, USA, IEEE, US, Nov. 15, 1999, pp. 43–50, XP010370695, ISBN: 0-7803-5904-6.

Nogueroles, R. et al.: "Improved Performance of a Random OFDMA Mobile Communication System" Vehicular Technology Conference, 1998. VTC 98. 48th IEEE Ottawa, Ontario, Canada, May 18–21, 1998, (May 18, 1998), pp. 2502–2506, XP010288120, ISBN: 0-7803-4320-4.

Kinugawa, Y. et al.: "Frequency and Time Division Multiple Access with Demand–Assignment Using Multicarrier Modulation for Indoor Wireless Communications Systems", IEICE Transactions on Communications, Institute of Electronics Information and Comm. Eng. Tokyo, Japan, vol. E77-B, NR. 3, Mar. 1994, pp. 396–402, XP000451014, ISSN: 0916-8516.

Farsakh, C. et al., "Maximizing the SDMA Mobile Radio Capacity Increase by DOA Sensitive Channel Allocation", Wireless Personal Communications, Kluwer Academic Publishers, NL, vol. 11, No. 1, Oct. 1999, pp. 63–76, XP000835062, ISSN: 0929-6212.

Bender et al., *CDMA/HDR: A Bandwidth–Efficient High–Speed Wireless Data Service for Nomadic Users*, IEEE Communications Magazine, Jul. 2000, pp. 70–87.

Tsoulos, G.V., *Smart Antennas For Mobile Communication Systems: Benefits And Challenges*, Electronics & Communication Engineering Journal, Apr. 1999, pp. 84–94.

Shad et al., *Indoor SDMA Capacity Using a Smart Antenna Basestation*, 1997 IEEE, pp. 868–872.

Farsakh, Christof and Nossek, Josef A., *On the Mobile Radio Capacity Increase Through SDMA*, no date (after 1997).

Frullone et al., *PRMA Performance in Cellular Environments with Self–Adaptive Channel Allocation Strategies*, IEEE Transactions on Vehicular Technology, Nov. 1996, pp. 657–665 vol. 45, No. 4.

Xu, Guanghan and Li, San–Qi, *Throughput Multiplication of Wireless Lans for Multimedia Services: SDMA Protocol Design*, 1994 IEEE, pp. 1326–1332.

Ward, James and Compton, R. Ted, Jr., *High Throughput Slotted ALOHA Packet Radio Networks with Adaptive Arrays*, IEEE Transactions on Communications, Mar. 1993, pp. 460–470, vol. 41, No. 3.

\* cited by examiner

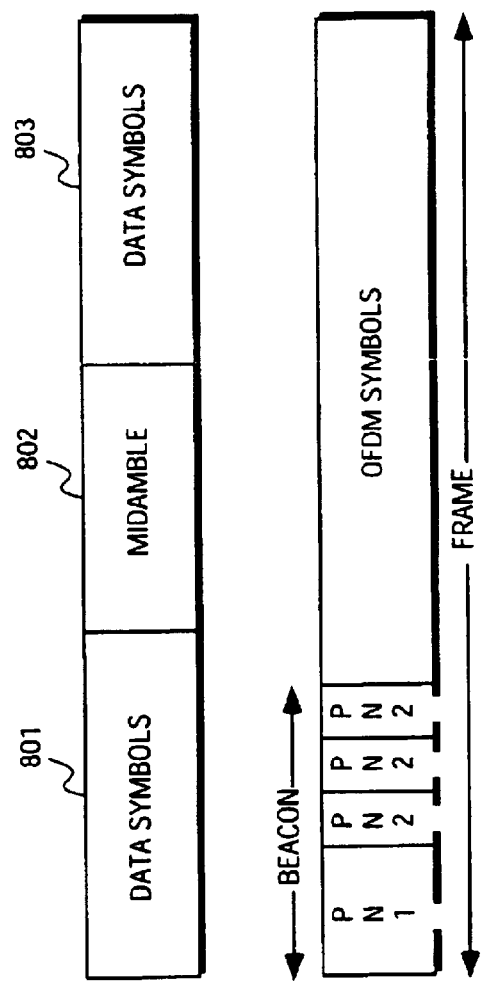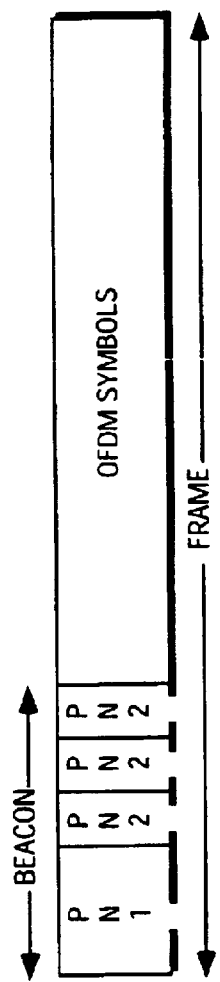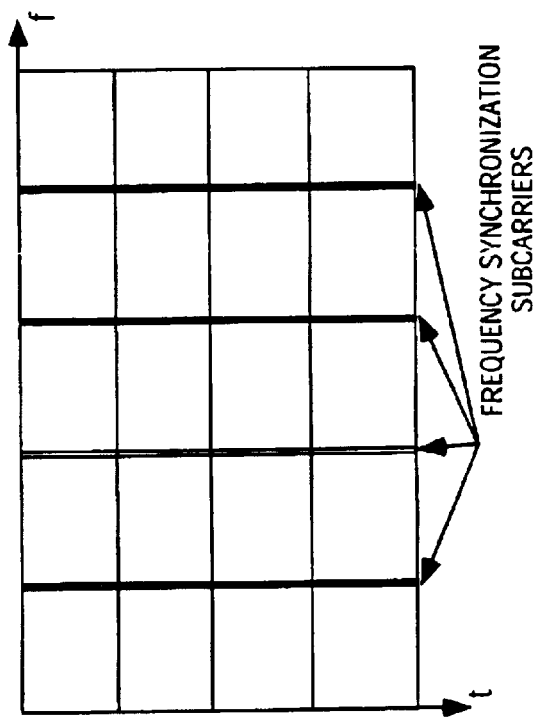

COMMUNICATION SYSTEM USING OFDM FOR ONE DIRECTION AND DSSS FOR ANOTHER DIRECTION

FIELD OF THE INVENTION

This invention relates to communications and, more particularly, to multi-subscriber systems utilizing the basic modulation formats of orthogonal frequency division multiplexing (OFDM) and spread spectrum transmission.

BACKGROUND OF THE INVENTION

With high-speed wireless services increasingly in demand, there is a need for more throughput per bandwidth to accommodate more subscribers with higher data rates while retaining a guaranteed quality of service (QoS), all over a packet network. While the definition for "wireless broadband" may vary, it is commonly accepted that the next-generation wireless broadband networks must be able to provide a wide variety of services, from high-quality voice to high-definition videos, through IP-centric, high-speed (>10 Mbps downlink and >512 Kbps uplink) wireless channels. See Shingo Ohmori, et. al, "The Future Generations of Mobile Communications Based on Broadband Access Technologies," IEEE Communication Magazine, December 2000.

Due to the asymmetric nature of packet traffic, the requirements for wireless uplink (from subscribers to basestations or access points) and downlink (from base-stations or access points to subscribers) are quite different. High throughput/spectral efficiency is of paramount importance in the traffic-heavy downlink, even if it means more involved hardware and higher cost power amplifiers at the basestation. On the other hand, amplifier efficient modulation schemes are critical to the subscriber terminal, in order to reduce cost and improve power efficiency. Clearly, separate design optimization approaches must be adopted for the design of uplink and downlink modems. However almost all current systems, e.g., the popular GSM and IS-95 networks, utilize a uniform modem and multiple-access structure for both uplink and downlink. As a result, the efficiency of the overall system is compromised.

Orthogonal frequency division multiplexing (OFDM) and direct-sequence spread spectrum (DSSS) are two modulation techniques frequently used for wireless communications. In OFDM, as illustrated in FIG. 1, a wide bandwidth is divided into multiple narrow-band subcarriers, which are arranged to be orthogonal with each other. The signals modulated on the subcarriers are transmitted in parallel. In DSSS, a modulation symbol is first spread across the available bandwidth by a spreading sequence and then transmitted. In code-division multiple access (CDMA), multiple subscriber stations communicate with a base stations using DSSS signaling with different spreading sequences.

OFDM is an efficient technique for multipath fading channels. In a well-designed system, the frequency response of each subcarrier can be made flat or near flat. Therefore, only very simple or even no channel equalization is required. Another significant advantage of OFDM is that it allows an optimal power and rate allocation to maximize the channel capacity. This inherent advantage is even more significant in a cellular system with multiple subscribers where the channel response of each subscriber is different. In this case, it is possible to maximize the entire system capacity throughput by judicious allocations of subcarriers to multiple subscribers.

On the other hand, OFDM also possesses some disadvantages. One of the disadvantages is the large peak-to-average power (PAP) ratio of the OFDM signals. This is a significant hurdle for implementing OFDM-based systems. A large PAP ratio means more stringent linearity requirements on the power amplifier or large back off, leading to higher cost or lower transmission power. This is especially undesirable for the implementation of subscriber terminals, which dominates the system cost due to their large quantity. In addition, to achieve the maximum capacity of OFDM with adaptive subcarrier allocation, it is often required to feedback the channel measurement at the subscribers to the basestation. This can also add overhead and complicate the system control.

DSSS often deals with the multipath channel through the use of so-called Rake receiver, which coherently adds together the signals received from multiple delay paths. However, when the data rate is high and the spreading factor is low, the performance of the Rake receiver degrades. Furthermore, a DSSS signal equally utilizes the entire spectrum, including both high-gain frequencies and low-gain frequencies. Therefore, the potential capacity of DSSS is less than that achieved by OFDM with adaptive subcarrier allocation. On the other hand, a DSSS signal typically has lower PAP than an OFDM signal. In addition, the use of DSSS enables code-division multiple-access that provides great multiple-access flexibility among many multiple-access schemes. Therefore, DSSS is still a very attractive technique especially for subscriber terminal transmission.

OFDM and DSSS both are widely used in wireless communications, but in most systems, a single technology is used for both downlink and uplink. For example, in the UMTS W-CDMA system, DSSS is used for both downlink and uplink, while in IEEE 802.11a, OFDM is used for both downlink and uplink. This means the advantages and disadvantages are both present in the system. For more information on W-CDMA, see H. Holma and A. Toskala, "WCDMA for UMTS," John Wiley & Sons, Inc., 2000. For more information on OFDM, see R. van Nee and R. Prasad, "OFDM for Wireless Multimedia Communications," Artech House Publishers, 2000.

SUMMARY OF THE INVENTION

A method and apparatus for communication are described. In one embodiment, a method for communicating with a subscriber comprises transmitting orthogonal frequency division multiplexing (OFDM) signals to the subscriber, and receiving direct-sequence spread spectrum (DSSS) signals from the subscriber.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 8 illustrates an exemplary data format of uplink transmission signal.

FIG. 9 illustrates an exemplary data format of downlink transmission signal.

FIG. 10 illustrates exemplary pilot subcarriers for frequency tracking.

DETAILED DESCRIPTION OF THE PRESENT INVENTION

Figure 1A:
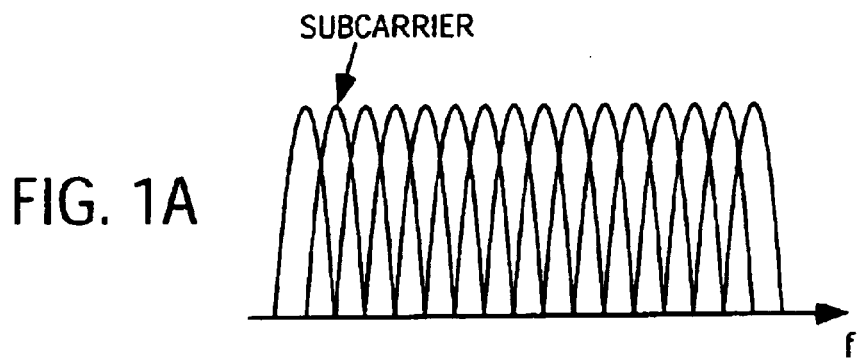
FIG. 1A illustrates an OFDM signal and subcarriers in a frequency domain.

A method and apparatus to integrate OFDM and CDMA technologies is described. In one embodiment, a method for communicating with a subscriber comprises transmitting orthogonal frequency domain multiplexing (OFDM) signals to the subscriber, and receiving direct-sequence spread spectrum (DSSS) signals from the subscriber.

The techniques described herein increase, and potentially maximize, the downlink throughput while increasing, and potentially optimizing, the power efficiency of uplink, and at the same time, maintain the multiple-access flexibility of the overall system. In one embodiment, OFDM is used for downlink to increase, and potentially maximize, the spectral efficiency and the bit rate. This is an important feature for today's Internet access due to its asymmetric nature. DSSS/CDMA is used for uplink to avoid the large peak-to-average ratio problem of OFDM and increases, and potentially maximize, the multiple-access flexibility. Alternatively, CDMA techniques other than DSSS may be used. For example, frequency hopping (FH) may be used.

In one embodiment, the subcarriers of the OFDM downlink are adaptively allocated to multiple subscribers to increase, and potentially maximize, the system capacity. The uplink CDMA signals received at the base station from the multiple subscribers may be utilized for the adaptive allocation.

Although at least one embodiment is described with reference to wireless communications, the teachings of the present invention are equally applicable to wired communications, such as, for example, but not limited to, cable modems.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Figure 1B:
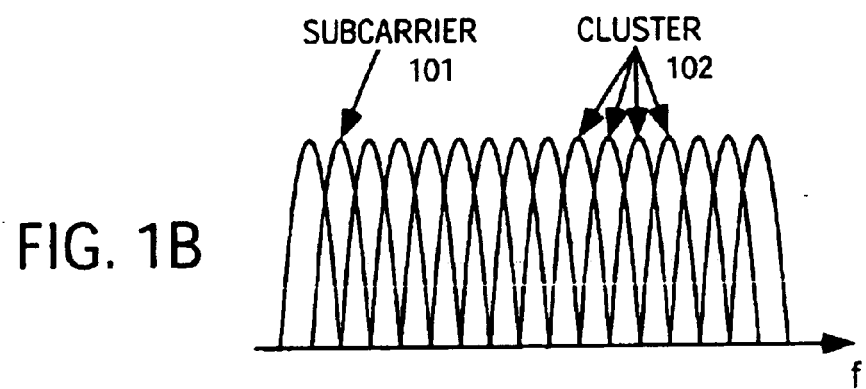
FIG. 1B illustrates multiple subcarriers and a cluster.

FIG. 1B illustrates multiple subcarriers, such as subcarrier 101, and cluster 102. A cluster, such as cluster 102, is defined as a logical unit that contains at least one physical subcarrier, as shown in FIG. 1B. A cluster can contain consecutive or disjoint subcarriers. The mapping between a cluster and its subcarriers can be fixed or reconfigurable. In the latter case, the base station informs the subscribers when the clusters are redefined. In one embodiment, the frequency spectrum includes 512 subcarriers and each cluster includes four consecutive subcarriers, thereby resulting in 128 clusters.

Figure 2:
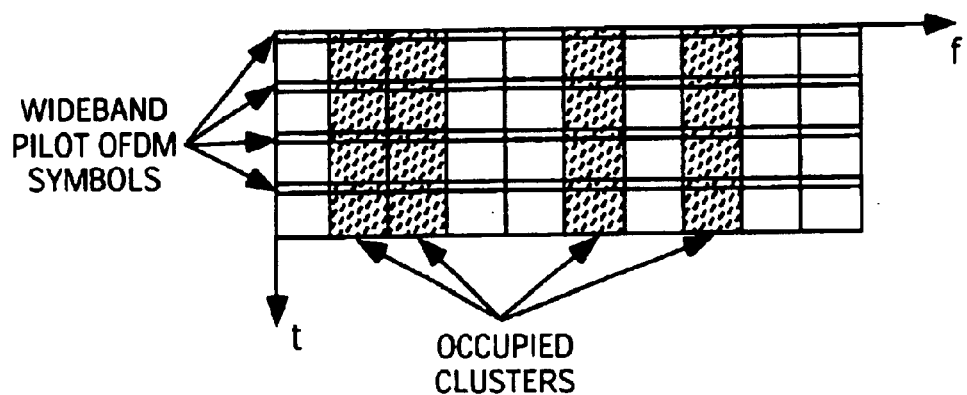
FIG. 2 illustrates OFDM subcarrier clusters and pilot symbols in the time-frequency domain.

In one embodiment, each base station transmits pilot symbols simultaneously, and each pilot symbol occupies the entire OFDM frequency bandwidth, as shown in FIG. 2. In one embodiment, each of the pilot symbols has a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds.

Figure 3:
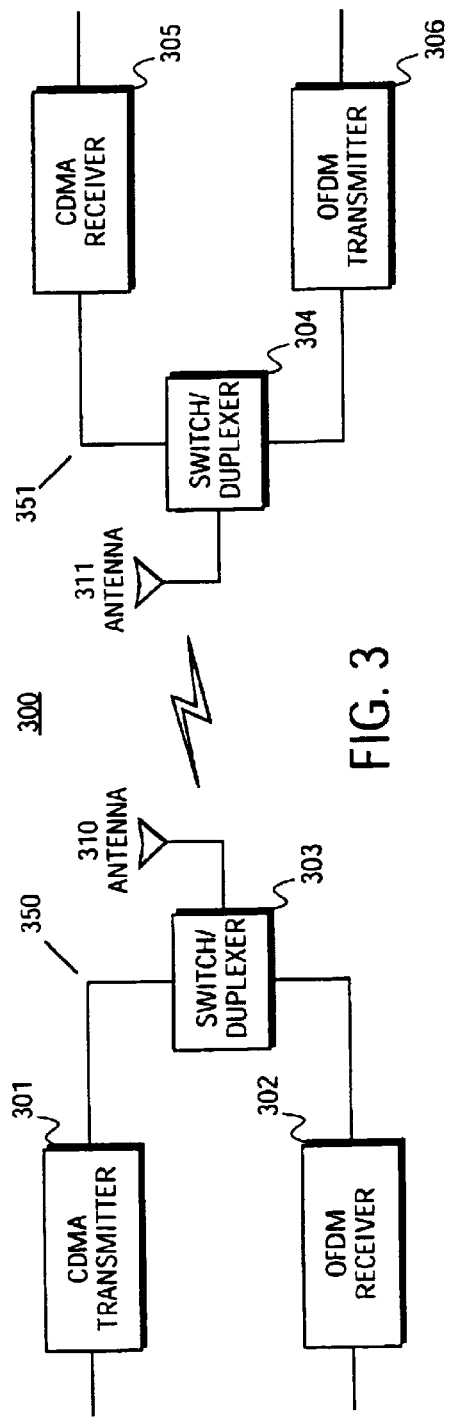
FIG. 3 illustrates a communication network using OFDM for the transmission in one direction and CDMA for the transmission in the other direction.

FIG. 3 is a block diagram of a communication network using OFDM for transmission in one direction and CDMA for transmission in the other direction. Each of the processing blocks in FIG. 3, as well as the other figures, are performed by processing logic that may comprise hardware, (e.g., circuitry, dedicated logic, etc.), software (such as is run on a general purpose computer system or a dedicated machine), or a combination of both.

Referring to FIG. 3, communication network 300 includes multiple communication systems (e.g., base stations, access points, head ends, mobile units, subscribers, remotes, terminal units, etc.). Although only two systems are shown, communication network 300 may include more than two systems. At one site, system 350 includes a CDMA transmitter 301 to transmit information using CDMA to modulate signals for wireless communications and an OFDM receiver 302 to process wireless communications in the form of OFDM signals received from other locations in the network. A switch 303 switches between CDMA transmitter 301 and OFDM receiver 302, thereby coupling only one of them to antenna 310 at any one time.

For time division duplexing (TDD), which uses time division multiplexing to support full duplex communication, or other systems in which communication in both directions is at the same frequency, switch 303 comprises a time switch. In an alternative embodiment, for frequency division duplexing (FDD), where different frequency bands are used to transmit or receive information in each direction, or other such systems, switch 303 is replaced by a frequency duplexer.

System 351 includes an OFDM transmitter 306 to generate OFDM signals for communications via wireless transmission to other sites in the system and a CDMA receiver 305 to process CDMA signals received from other sites in the system. A switch 304 (or duplexer) couples CDMA receiver 305 and OFDM transmitter 306 to antenna 314 one at a time. Switches/duplexers 304 and 303 allow antennas 311 and 310, respectively, to be used for both transmission and reception simultaneously.

In one embodiment, system 350 comprises a subscriber in a mobile communication system while system 351 comprises a base station. Thus, as shown in FIG. 3, OFDM is used for downlink. The use of OFDM for downlink may maximize the spectral efficiency and the bit rate. CDMA is used for uplink to substantially avoid the large peak-to-average ratio problem of OFDM and to offer multiple-access flexibility.

In one embodiment, the subcarriers of the OFDM downlink are adaptively allocated to multiple subscribers to achieve multiplexing and to increase (and potentially maximize) the system capacity. Information extracted from uplink CDMA signals received at the base station from the multiple subscribers may be utilized for the adaptive subcarrier allocation This is described in more detail below.

In one embodiment, a 5 MHz spectrum is used for each downlink OFDM channel. With pulse shaping, the net bandwidth used for data transmission is 4 MHz, which is divided into 512 subcarriers transmitted in parallel. In one embodiment, each of the OFDM symbols has a length of duration of 128 microseconds with a guard interval of 24 microseconds. Therefore, the total symbol period is 152 microseconds. In one embodiment, all the subcarriers in one OFDM symbol are used for one subscriber. Service to multiple subscribers may be achieved through time-division multiplexing (TDM), e.g., different subscribers use different OFDM symbols at different times. In another embodiment, the subcarriers in one OFDM symbol can be used by multiple subscribers, each using part of the total subcarriers. In one embodiment, any subcarrier can be assigned to any subscriber. In another embodiment, the granularity of subcarrier assignment is increased to a fixed number of subcarriers, called clusters, as shown in FIGS. 1A and 2. Any subscriber can be assigned any cluster. Subcarrier clustering reduces subcarrier indexing overhead.

Figure 4:
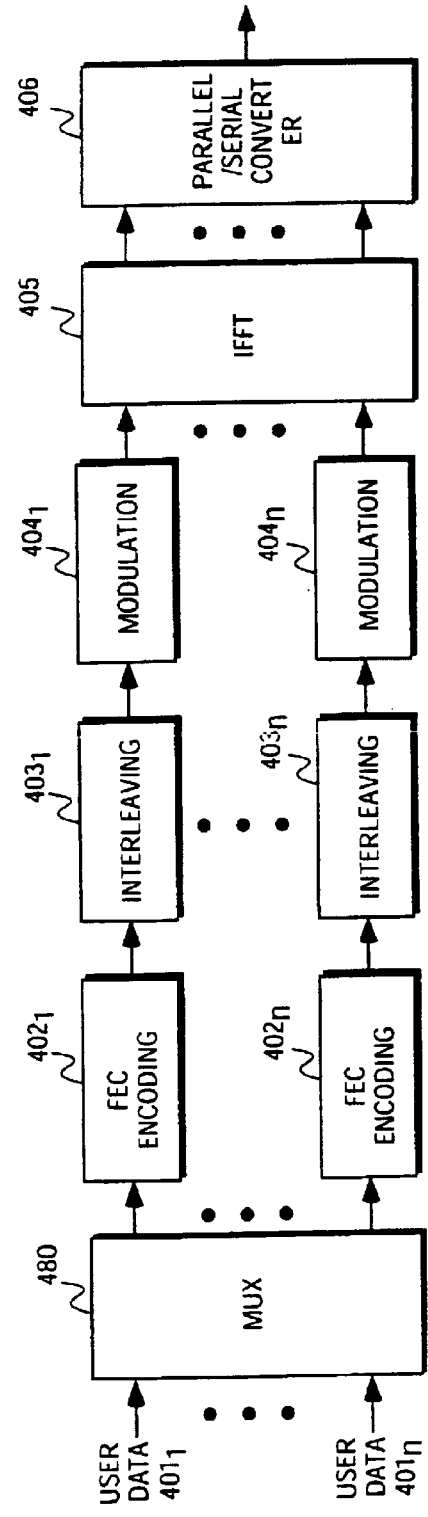
FIG. 4 is a block diagram of one embodiment of a base station transmitter that uses OFDM for downlink communications.

FIG. 4 is a block diagram of one embodiment of a base station transmitter that uses OFDM for downlink communications. Referring to FIG. 4, the base station comprises N processing paths, or chains, labeled 1–n, with each processing path comprises forward error correction (FEC) encoder 402, followed by interleaver 403, and thereafter modulator 404. There is a processing path for each of the n subscribers communicating with the base station. In one embodiment, a media access control (MAC) (not shown) or other multiplexing mechanism is used to direct user data to individual processing paths for different clusters.

As shown in FIG. 4, user data $401_{1-n}$ comprises data that is to be transmitted to individual subscribers. Multiplexer (MUX) 480, operating as part of a subcarrier allocator, receives the user data $401_{1-n}$ and outputs cluster data generated as a result of the allocator allocating subcarrier groups for transmission to individual subscriber and the user data being modulated onto the subcarriers. In an alternative embodiment, MUX 480 is not included and the user data is fed directly to forward error correction (FEC) encoders 402.

The cluster data is first encoded by a forward error correction (FEC) encoder 402 in a manner well-known in the art. The results of the encoding is the addition of embedded sufficient redundant information in the user data to allow a receiver to correct it. The user data is then interleaved by interleaver 403, which reorders code symbols (e.g., bits) in the user data in such a manner that successive code symbols are separated by multiple symbols in the sequence to be transmitted. This is well-known in the art. Thereafter, the base station modulates the interleaved user data, using a digital modulation method, such as QPSK, 16QAM or others described below, via modulator 404. The modulated data on all subcarriers (intended for multiple subscribers) is processed by Inverse Fast Fourier Transform (IFFT) 405 in a manner well-known in the art. The outputs of IFFT 405 are input to parallel-to-serial converter 406, which converts the parallel outputs of IFFT 405 into a serial output OFDM signal in a manner well-known in the art. In one embodiment, an additional guard interval (cyclic prefix) is inserted at this point. The resulting OFDM signal is transmitted through the RF channel.

Figure 12:
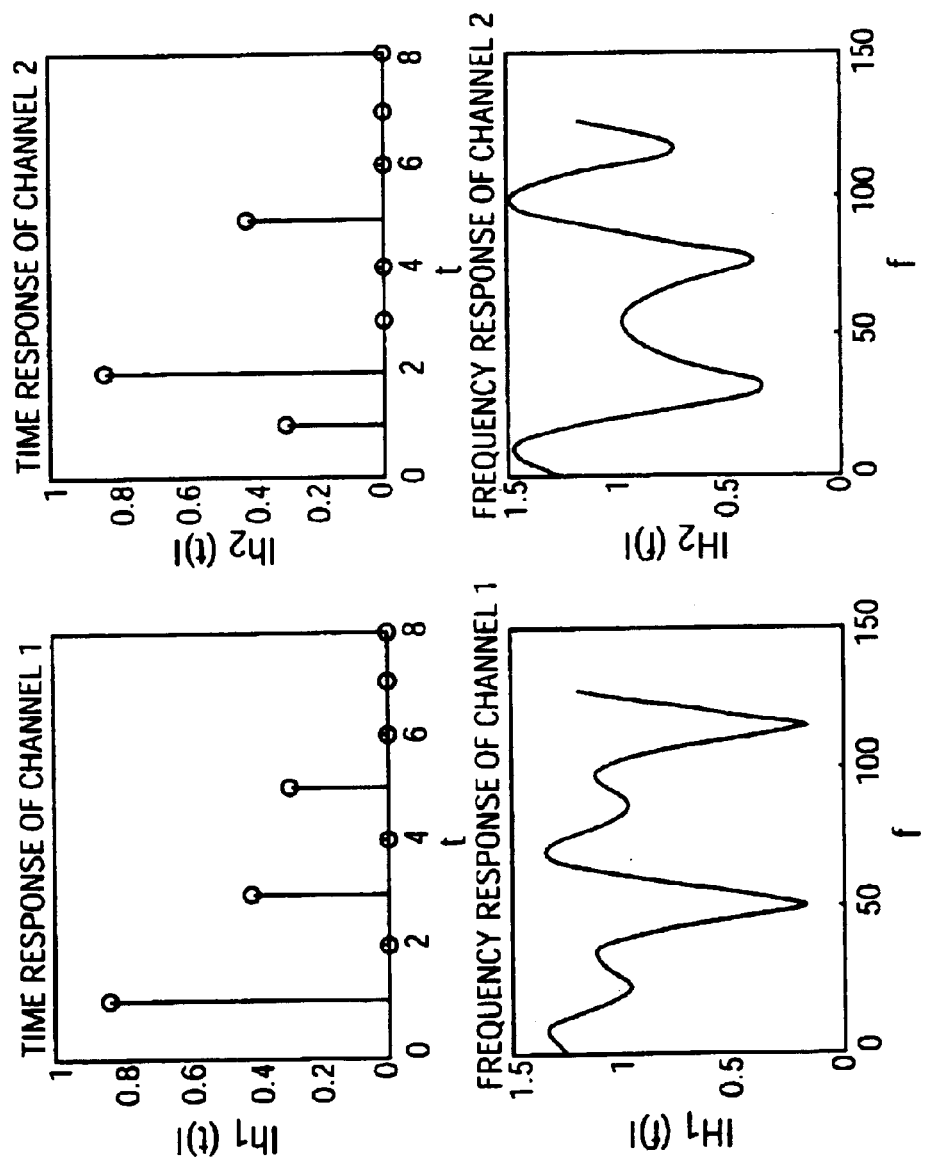
FIG. 12 illustrates channel responses associated with different subscribers.

In one embodiment, the base station adaptively allocates subcarriers to subscribers to increase (and potentially maximize) the spectral efficiency. FIG. 12 illustrates channel responses associated with different subscribers. As shown in FIG. 12, the channel responses corresponding to two subscribers are different. Multi-user adaptive loading increases the total system capacity by allocating subcarriers with relatively high signal-to-noise ratios to a subscriber. The frequency responses are sent to a subcarrier allocator at a base station for adaptive subcarrier allocation, so only subcarriers with relatively high signal-to-noise ratios are allocated for the downlink transmission to a subscriber. Furthermore, the FEC coding and modulation scheme can be made adaptive depending on the signal-to-noise ratio of each or multiple subcarriers.

In one embodiment, the downlink SNR for each subcarrier is measured by the subscriber. The information is fed back to the base station subcarrier allocator, which collects the SINR information from all subscribers. The subcarrier allocator can then perform optimal or suboptimal allocating algorithms to assign the subcarriers with relatively high SNR to a subscriber. In another embodiment, as described below, the SNR information is directly derived from the uplink signals sent by each subscriber. These two techniques are described in further detail below. The two techniques of collecting the SNR information can also be combined. For example, the two could be combined by using a weighted average of the two. Alternatively, the combination could be based on time where either operates at different times and not continuously, and the SNR information resulting from both are used.

Figure 5:
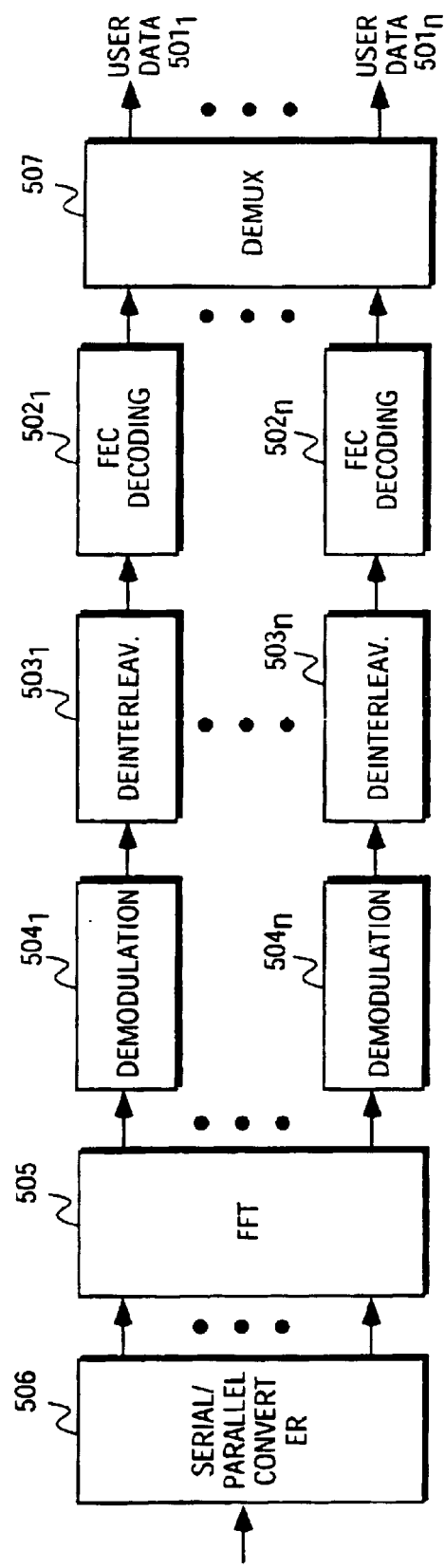
FIG. 5 is a block diagram of one embodiment of a subscriber terminal receiver.

FIG. 5 is a block diagram of a subscriber terminal receiver that includes functionality to process received OFDM signals in reverse order of the processing illustrated in FIG. 4. The data for the subscriber that results is passed to its upper data link layer.

In one embodiment, the received signals are sampled sequentially in time, with the samples being stored in memory. Once a predetermined number of samples have been received (e.g., 512 samples), serial-to-parallel connector 506 converts the incoming OFDM signal (in the form of samples) into a parallel form in a manner well-known in the art. The outputs of serial-to-parallel converter 506 are received by inputs of Fast Fourier Transform (FFT) 505, which applies a Fast Fourier Transform in a manner well-known in the art. The outputs of FFT 505 are sent to one of a number of different paths. That is, these outputs of FFT 505 are coupled to multiple processing paths, labeled 1–n.

Each processing path includes a demodulator 504 to demodulate the signal using demodulation techniques to reverse the modulation applied by the base station as described herein. The receiver then de-interleaves the demodulated signals using de-interleaver 503 in a manner well-known in the art. The receiver takes the reordered demodulated data from de-interleaver 503 and performs FEC decoding in a manner well-known in the art using FEC decoder 502 to generate user data 501. In one embodiment, the outputs of FEC decoder 502 represent cluster data.

A demultiplexer (Demux) 507, which may be part of a media access control (MAC) layer, demultiplexes the output from FEC decoders $502_{1-n}$, from multiple subcarriers, where the user data is on clusters of subcarriers, to create user data $501_{1-n}$.

Note that in a software implementation of the receiver in which the processing blocks of FIG. 5 are implemented in software, signals received using the antenna are sampled and the samples are stored in a memory for processing by the processing blocks.

Figure 6:
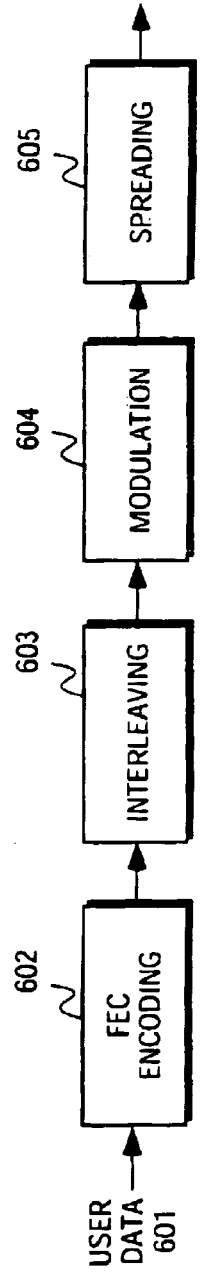
FIG. 6 is a block diagram of one embodiment of a subscriber terminal transmittter that uses DSSS/CDMA for uplink communications.

FIG. 6 is a block diagram of one embodiment of the subscriber terminal transmitter that uses DSSS/CDMA for uplink communications. Referring to FIG. 6, the uplink data is first encoded with forward error correcting code in FEC encoder 602, and then interleaved through interleaver 603 in the same manner as described above. The receiver then modulates the interleaved data via modulator 604. After modulation, the receiver applies the subscriber's spreading code to the modulated interleaved data via spreading processing block 605. The spreading signal is pulse shaped and sent through the radio frequency (RF) channel.

Figure 7:
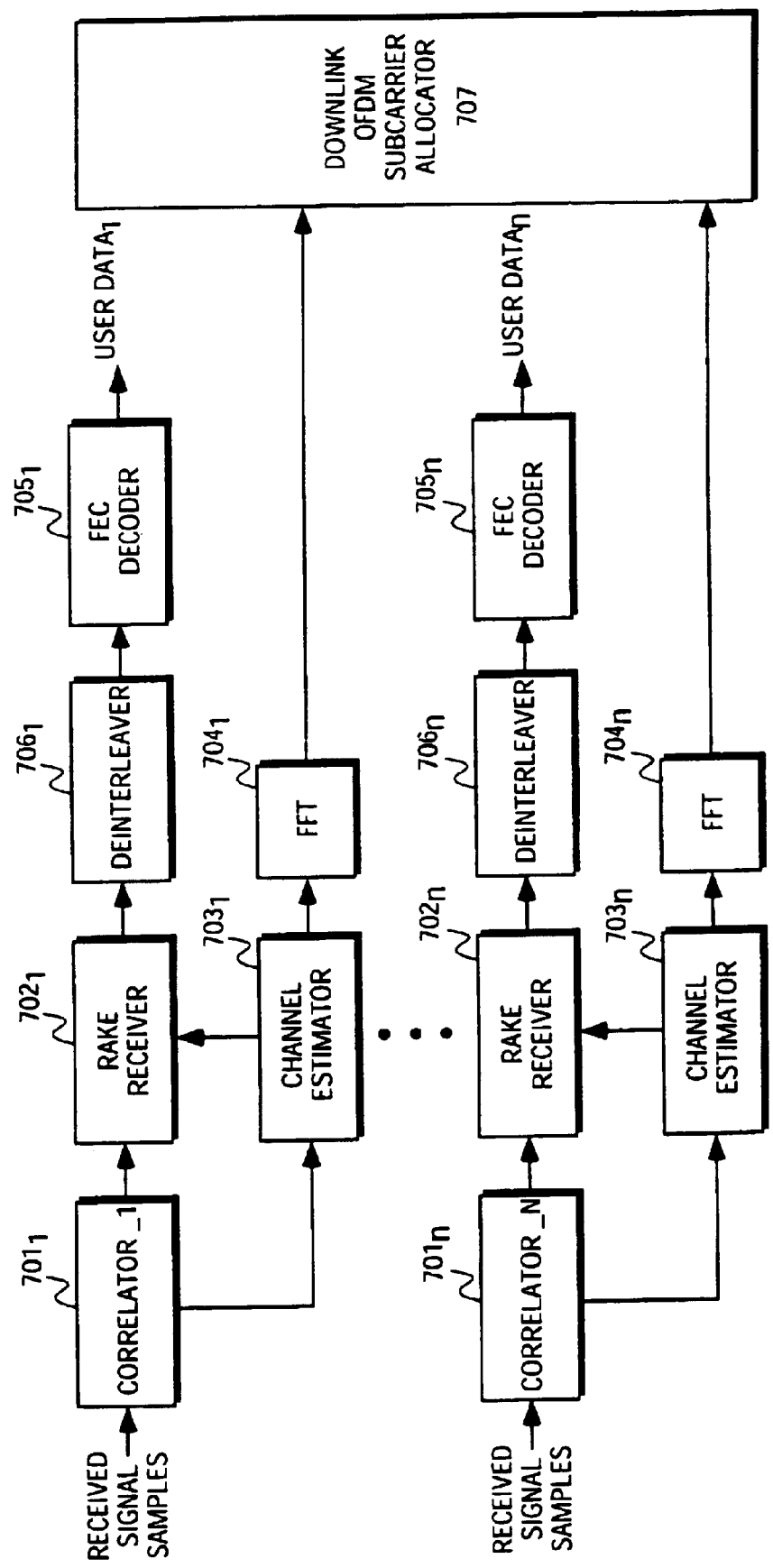
FIG. 7 is a block diagram of one embodiment of a base station receiver and downlink subcarrier allocator.

FIG. 7 is a block diagram of one embodiment of a base station having a receiver and a downlink subcarrier allocator. Referring to FIG. 7, there are n processing paths coupled to the downlink OFDM subcarrier allocator 707. In one embodiment, each processing path is for an individual user. Since all of the other paths perform in the same manner, only one of the paths will be described.

Note that in a software implementation of the receiver in which the processing blocks of FIG. 7 are implemented in software, signals received using the antenna are sampled and the samples are stored in a memory for processing by the processing blocks.

The received signal samples are input to correlator 701, which despreads the samples using the same spreading sequence that was used during transmit and correlates the incoming signal with a subscriber's spreading code. In an alternative embodiments, correlator 701 may be replaced with a match filter. The receiver inputs the output of correlator 701, which is a correlation result, to Rake receiver 702 and channel estimator 703. Rake receiver 702 processes the correlation result via maximum ratio combining in a manner well-known in the art, including performing demodulation, and outputs the processed result to de-interleaver 705. De-interleaver 705 performs de-interleaving and outputs the unscrambled data to FEC decoder 706. FEC decoder 706 performs FEC decoding in a manner well-known in the art. The output of FEC decoder 705 is the user data. This decoded data is then passed to upper data link layer.

The channel estimator 703 estimates the channel response and provides that estimate to Rake receiver 702 and FFT 704. Rake receiver 702 uses the channel estimate to determine which of the fingers to select for combing. FFT 704 converts the channel response into a frequency response in a manner well-known in the art.

Allocator 707 receives frequency responses from FFT 704 for multiple subscribers and allocates subcarriers based on the responses received.

In one embodiment, each user is assigned a unique spreading sequence. Furthermore, the uplink transmission signal may contain a unique training sequence, as described below in conjunction with FIG. 8. The sequence is utilized at the base station to estimate the channel. Once the channel time response is estimated, its frequency response is derived using FFT 704. The frequency responses of all the subscribers are sent to the subcarrier allocator 707 for adaptive subcarrier allocation, as shown in FIG. 7.

In one embodiment, the size of FFT 704, in terms of the number of points, after channel estimation is the same as that for downlink OFDM transmission. In another embodiment with subcarrier clustering, the size of FFT 704 after channel estimation is smaller than that for downlink OFDM transmission. For example, if the size of FFT 704 for the downlink OFDM is 512 and the number of consecutive subcarriers in a cluster is 16, only a 32-point FFT is needed for channel-frequency response estimation at the base station receiver.

In another embodiment, the channel frequency response associate with a subscriber is estimated based on the uplink spreading spectrum signals without the use of training sequences or pilot signals. The frequency response is estimated to within a phase ambiguity, and the amplitude response is untilized in subcarrier allocations.

FIG. 8 illustrates one embodiment of a data format of a CDMA signal in one time frame. Referring to FIG. 8, data symbols 801 and 803 are on both sides of, optional training symbols, referred to herein as midambles 802. The optional training symbols (midambles), preferably inserted in the middle of the frame, can be used for channel estimation for coherent detection of CDMA signals. The spreading codes for the midambles may be different from the spreading code for the data symbols. Longer spreading codes for the midambles (e.g., twice as long) can improve channel estimation at the receiver and therefore improve the overall performance.

The uplink CDMA signals from subscriber units can be either synchronized or asynchronized. For synchronized CDMA, the arrival of each uplink signal at the base station is time aligned. This may simplify the receiver processing at the base station. For example, with regard to FIG. 7, the correlations for all of the individual users may be combined using, for example, a multi-dimensional signal transform.

In one embodiment, all subscriber units synchronize to its base station in both time and frequency. A base station periodically broadcasts a "beacon signal", followed by regular OFDM symbols. The beacon signal is used by the subscriber units for synchronization and preferably occurs once in a time frame of, for example, 10 millisecond. In one embodiment, the beacon signal itself is one OFDM signal or multiple OFDM signals. In another embodiment, the beacon signal contains spread-spectrum pseudo-noise (PN) sequences, as shown in FIG. 9. Referring to FIG. 9, although only four PN sequences are shown, any number may be used. In one embodiment, the first PN sequence, PN1, or some other predetermined number of PN sequences, can be used for time synchronization at the subscriber units through sequence correlation in a manner well-known in the art. The PN sequences (PN2 following PN1), preferably identical, can be used for frequency tracking at the subscriber units through sequence correlation and comparing the phase differences between pairs of correlation results. In one embodiment, it is necessary that there be multiple PN2 sequences and that they be short in comparison to the PN1 sequence.

In one embodiment, a switch in the transmitter having a single output and a pair of inputs, one coupled to receive the PN sequences from a PN sequence generator and the other to the output of the FFT, is coupled to output data in the format shown in FIG. 9.

In one embodiment, pilot subcarriers are inserted into OFDM symbols, as shown in FIG. 10, so the subscriber units can further measure and correct carrier frequency errors (frequency tracking).

In one embodiment, the uplink CDMA signal is power controlled to reduce, and potentially minimize, the mutual interference. Power control can be performed in either open loop or closed loop, and preferably through a combination of both. A power control unit at the subscriber controls its transmission power. The power control unit accepts power adjustment command which can be generated locally (open loop) or received from the base station (closed loop). With open-loop power control, the subscriber unit monitors the downlink signal power to adjust its own transmission power. Since the CDMA signal is wideband but the multi-user OFDM downlink signal may not occupy the full bandwidth, as shown in FIG. 2, there can be a mismatch in downlink and uplink power measurement. One way to solve this problem is to always transmit full-bandwidth pilot OFDM symbols in the downlink, as shown in FIG. 2. The subscriber unit measures the downlink pilot-symbol power to adjust its own transmission power. One embodiment of the subscriber is shown in U.S. patent application Ser. No. 09/738,086, entitled "OFDMA with Adaptive Subcarrier-Cluster Configuration and Selective Loading," filed Dec. 15, 2000, assigned to the corporate assignee of the present invention, and incorporated herein by reference. In closed-loop power control, the power of an uplink CDMA signal is measured at the base station receiver. The required power adjustment for each subscriber unit is carried over the downlink transmission signals. For closed loop power control, the base station measures uplink power and sends a power control command to the subscribers, indicating to the subscribers any adjustment to their power level.

In one embodiment, the downlink and uplink transmission is arranged through frequency division duplexing (FDD). In this case, an RF duplexer is used to separate the transmission and receiving. In another embodiment, the downlink and uplink transmission is arranged through time division duplexing (TDD). In this case, a time switch controls the transmission and receiving.

Figure 11:
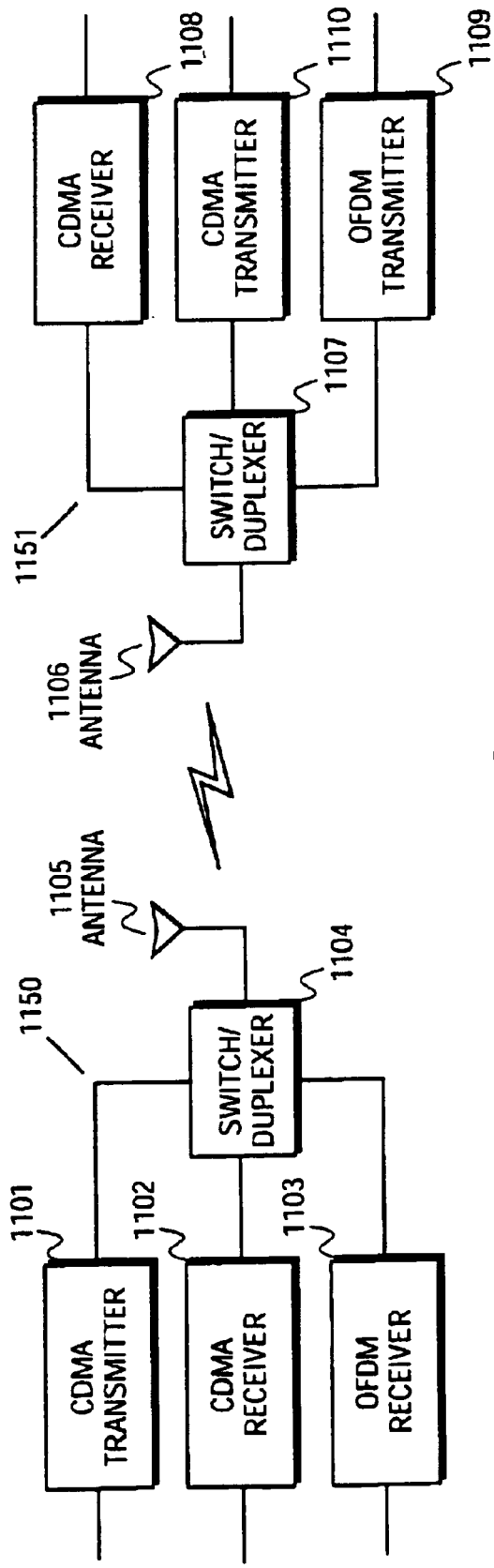
FIG. 11 is a block diagram of one embodiment of a duplexing system using CDMA for bi-directional transmission and an additional OFDM channel to enhance the data rate of one direction.

In another embodiment, CDMA is used for downlink and uplink transmission. To further enhance the data rate of downlink, an additional OFDM channel is used as shown in FIG. 11. Referring to FIG. 11, two communications systems (e.g., communication units, stations, etc.) are shown in the duplexing system. Communication system 1150 comprises CDMA transmitter 1101, CDMA receiver 1102, and OFDM receiver 1103 coupled to antenna 1105 via switch or duplexer 1104. Similarly, communication system 1151 comprises a CDMA receiver 1108, CDMA transmitter 1110, and OFDM transmitter 1109 coupled to antenna 1106 via switcher or duplexer 1107.

In one embodiment, CDMA transmitter and receiver pairs in each of the communication systems are implemented as a CDMA transceiver. In one embodiment, both systems include a CDMA transceiver and an OFDM transceiver, which comprises an OFDM transmitter and OFDM receiver.

Although FIG. 11 shows a point-to-point connection, the system may include other units (e.g., subscribers) that have CDMA transmitters and receivers and either an OFDM transmitter or receiver or both. Similarly, other unit(s) may be in the communication system and have a CDMA transmitter and a CDMA receiver without having OFDM communication capabilities. On the other hand, the additional unit(s) may have OFDM communication capabilities (OFDM transmitter and/or receiver) yet no CDMA communication capabilities.

In one embodiment, referred to herein as turbo mode, each channel (e.g., CDMA downlink, CDMA uplink, and OFDM downlink) occupies a different spectrum. For example, a CDMA downlink can use a 5 MHz channel in the frequency range 2110–2170 MHz and a CDMA uplink can use a 5 MHz channel in the range 1920–1980 MHz, while an OFDM downlink can use a 5 or 10 MHz channel at higher frequency range. In turbo mode, the pilot signals for subscriber unit synchronization can be carried over either the downlink CDMA channel or the downlink OFDM channel. The power control signals can also be carried over either the downlink CDMA channel or the downlink OFDM channel. When a pair of CDMA uplink and downlink channels has already been established, such as the IS-95 CDMA systems or the UMTS W-CDMA systems, it is preferable to use the downlink CDMA channel for uplink synchronization and power control and to use the beacon symbols, pilot symbols, pilot subcarriers embedded in the OFDM channel for the receiving of the downlink OFDM signals. The overhead of these synchronization symbols may be further reduced, if the synchronization signals of the CDMA downlink are efficiently utilized.

An Exemplary Subcarrier/Cluster Allocation Procedure

Figure 13:
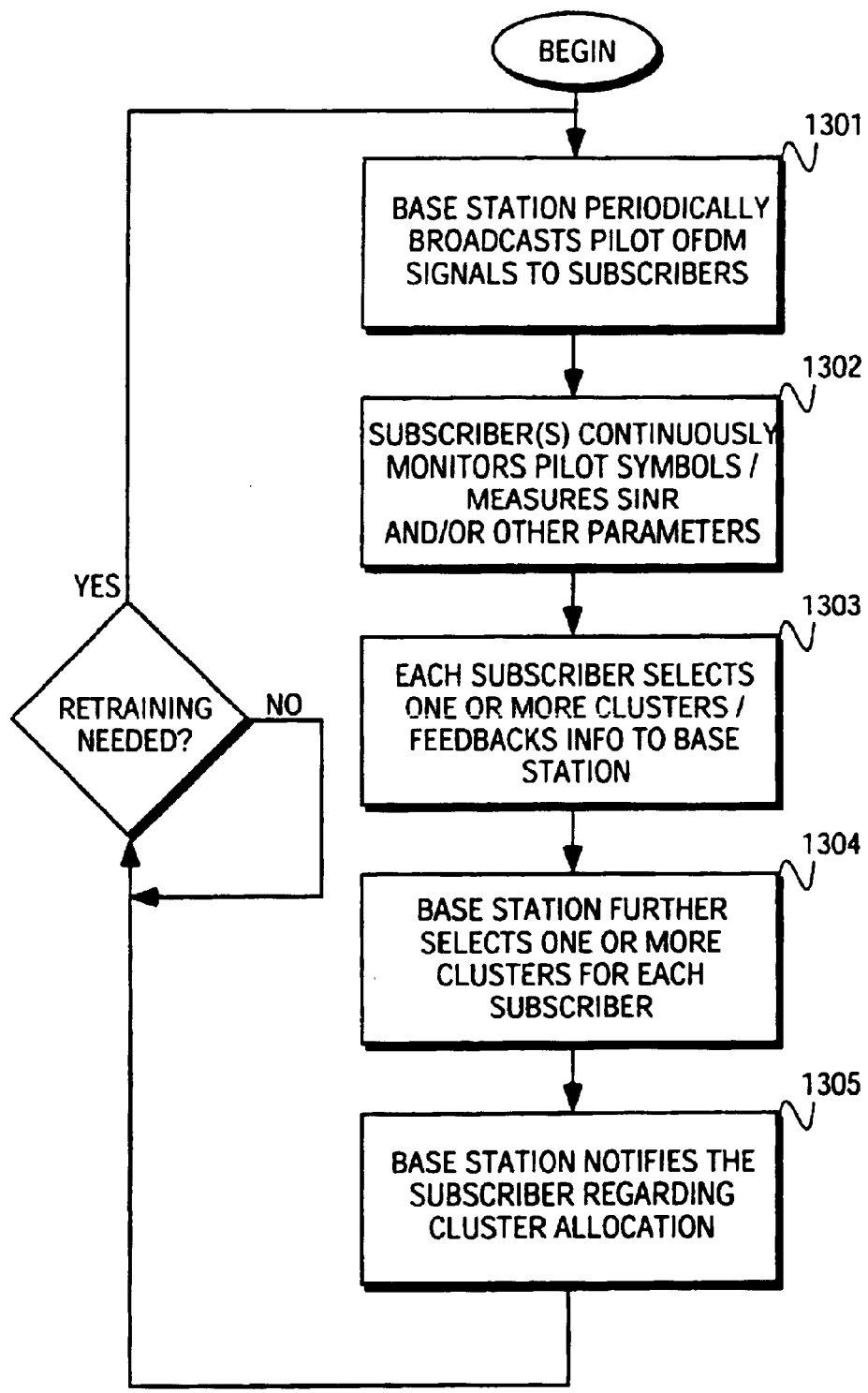
FIG. 13 is a flow diagram of one embodiment of a process for allocating subcarriers.

FIG. 13 is a flow diagram of one embodiment of a process for allocation clusters to subscribers. The process is performed by processing logic that may comprise hardware (e.g., dedicated logic, circuitry, etc.), software (such as that which runs on, for example, a general purpose computer system or dedicated machine), or a combination of both.

Referring to FIG. 13, each base station periodically broadcasts pilot OFDM symbols to every subscriber within its cell (or sector) (processing block 101). The pilot symbols, often referred to as a sounding sequence or signal, are known to both the base station and the subscribers. In one embodiment, each pilot symbol covers the entire OFDM frequency bandwidth. The pilot symbols may be different for different cells (or sectors). The pilot symbols can serve multiple purposes: time and frequency synchronization, channel estimation and signal-to-interference/noise (SINR) ratio measurement for cluster allocation.

Next, each subscriber continuously monitors the reception of the pilot symbols and measures the SINR and/or other parameters, including inter-cell interference and intra-cell traffic, of each cluster (processing block 1302). Based on this information, each subscriber selects one or more clusters with good performance (e.g., high SINR and low traffic loading) relative to each other and feeds back the information on these candidate clusters to the base station through predefined uplink access channels (processing block 1303). For example, SINR values higher than 10 dB may indicate good performance. Likewise, a cluster utilization factor less than 50% may be indicative of good performance. Each subscriber selects the clusters with relatively better performance than others. The selection results in each subscriber selecting clusters they would prefer to use based on the measured parameters.

In one embodiment, each subscriber measures the SINR of each subcarrier cluster and reports these SINR measurements to their base station through an access channel. The SINR value may comprise the average of the SINR values of each of the subcarriers in the cluster. Alternatively, the SINR value for the cluster may be the worst SINR among the SINR values of the subcarriers in the cluster. In still another embodiment, a weighted averaging of SINR values of the subcarriers in the cluster is used to generate an SINR value for the cluster. This may be particularly useful in diversity clusters where the weighting applied to the subcarriers may be different.

The feedback of information from each subscriber to the base station contains a SINR value for each cluster and also indicates the coding/modulation rate that the subscriber desires to use. No cluster index is needed to indicate which SINR value in the feedback corresponds to which cluster as long as the order of information in the feedback is known to the base station. In an alternative embodiment, the information in the feedback is ordered according to which clusters have the best performance relative to each other for the subscriber. In such a case, an index is needed to indicate to which cluster the accompanying SINR value corresponds.

Upon receiving the feedback from a subscriber, the base station further selects one or more clusters for the subscriber among the candidates (processing block 1304). The base station may utilize additional information available at the base station, e.g., the traffic load information on each subcarrier, amount of traffic requests queued at the base station for each frequency band, whether frequency bands are overused, and how long a subscriber has been waiting to send information. The subcarrier loading information of neighboring cells can also be exchanged between base stations. The base stations can use this information in subcarrier allocation to reduce inter-cell interference.

After cluster selection, the base station notifies the subscriber about the cluster allocation through a downlink common control channel or through a dedicated downlink traffic channel if the connection to the subscriber has already been established (processing block 1305). In one embodiment, the base station also informs the subscriber about the appropriate modulation/coding rates.

Once the basic communication link is established, each subscriber can continue to send the feedback to the base station using a dedicated traffic channel (e.g., one or more predefined uplink access channels).

In one embodiment, the base station allocates all the clusters to be used by a subscriber at once. In an alternative embodiment, the base station first allocates multiple clusters, referred to herein as the basic clusters, to establish a data link between the base station and the subscriber. The base station then subsequently allocates more clusters, referred to herein as the auxiliary clusters, to the subscriber to increase the communication bandwidth. Higher priorities can be given to the assignment of basic clusters and lower priorities may be given to that of auxiliary clusters. For example, the base station first ensures the assignment of the basic clusters to the subscribers and then tries to satisfy further requests on the auxiliary clusters from the subscribers. Alternatively, the base station may assign auxiliary clusters to one or more subscribers before allocating basic clusters to other subscribers. For example, a base station may allocate basic and auxiliary clusters to one subscriber before allocating any clusters to other subscribers. In one embodiment, the base station allocates basic clusters to a new subscriber and then determines if there are any other subscribers requesting clusters. If not, then the base station allocates the auxiliary clusters to that new subscriber.

From time to time, processing logic performs retraining by repeating the process described above (processing block 1306). The retraining may be performed periodically. This retraining compensates for subscriber movement and any changes in interference. In one embodiment, each subscriber reports to the base station its updated selection of clusters and their associated SINRs. Then the base station further performs the reselection and informs the subscriber about the new cluster allocation. Retraining can be initiated by the base station, and in which case, the base station requests a specific subscriber to report its updated cluster selection. Retraining can also be initiated by the subscriber when it observes channel deterioration.

Adaptive Modulation and Coding

In one embodiment, different modulation and coding rates are used to support reliable transmission over channels with different SINR. Signal spreading over multiple subcarriers may also be used to improve the reliability at very low SINR.

An example coding/modulation table is given below in Table 1.

TABLE 1

| Scheme | Modulation | Code Rate |
|---|---|---|
| 0 | QPSK,⅛Spreading | ½ |
| 1 | QPSK,¼Spreading | ½ |
| 2 | QPSK,½Spreading | ½ |
| 3 | QPSK | ½ |
| 4 | 8PSK | ⅔ |
| 5 | 16QAM | ¾ |
| 6 | 64QAM | ⅚ |

In the example above, ⅛ spreading indicates that one QPSK modulation symbol is repeated over eight subcarriers. The repetition/spreading may also be extended to the time domain. For example, one QPSK symbol can be repeated over four subcarriers of two OFDM symbols, resulting also ⅛ spreading.

The coding/modulation rate can be adaptively changed according to the channel conditions observed at the receiver after the initial cluster allocation and rate selection.

Pilot Symbols and SINR Measurement

Figure 14:
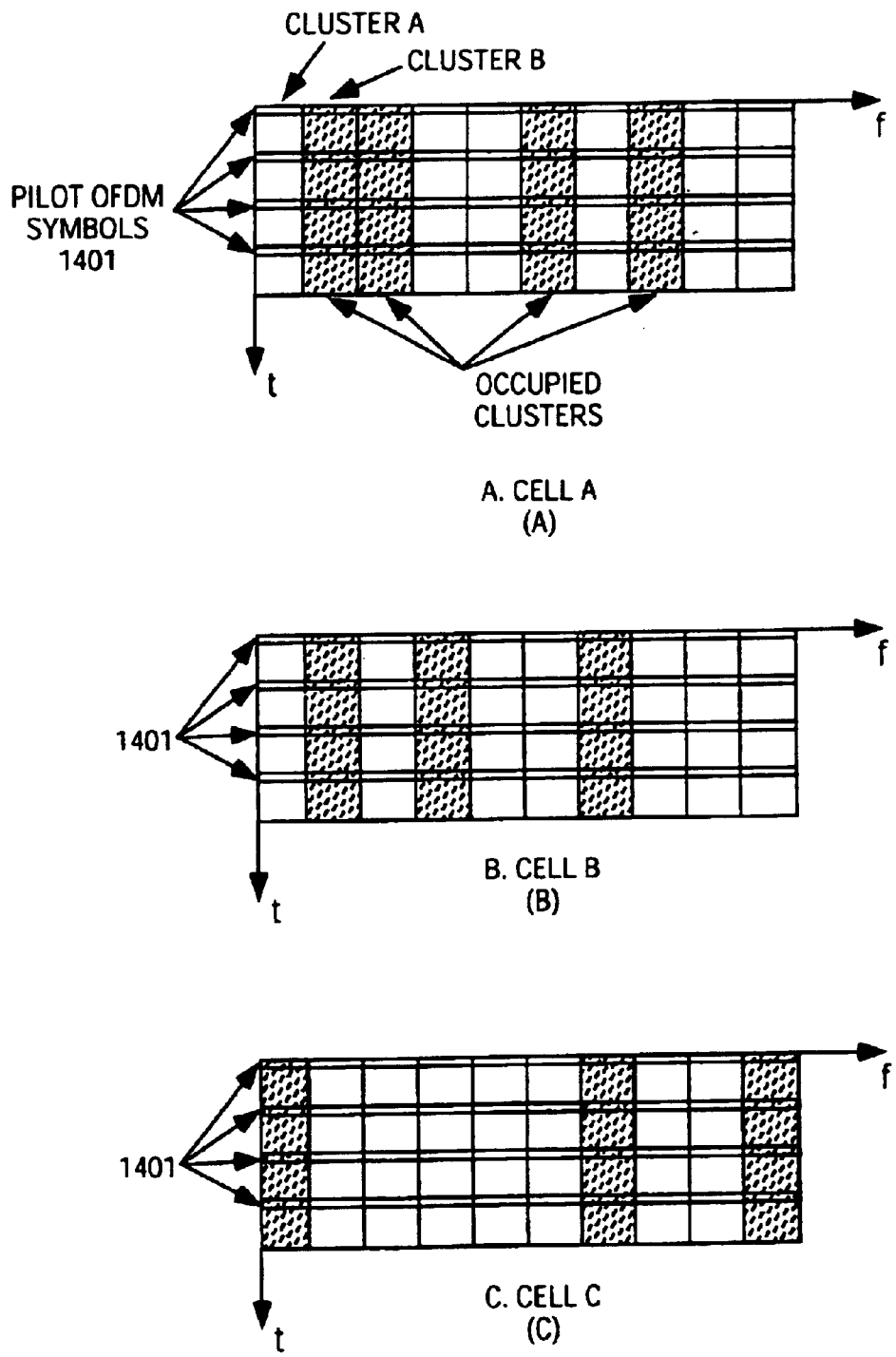
FIG. 14 illustrates time and frequency grid of OFDM symbols, pilots and clusters.

In one embodiment, each base station transmits pilot symbols simultaneously, and each pilot symbol occupies the entire OFDM frequency bandwidth, as shown in FIGS. 14A–C. Referring to FIGS. 14A–C, pilot symbols 1401 are shown traversing the entire OFDM frequency bandwidth for cells A, B and C, respectively. In one embodiment, each of the pilot symbols have a length or duration of 128 microseconds with a guard time, the combination of which is approximately 152 microseconds. After each pilot period, there are a predetermined number of data periods followed by another set of pilot symbols. In one embodiment, there are four data periods used to transmit data after each pilot, and each of the data periods is 152 microseconds.

A subscriber estimates the SINR for each cluster from the pilot symbols. In one embodiment, the subscriber first estimates the channel response, including the amplitude and phase, as if there is no interference or noise. Once the channel is estimated, the subscriber calculates the interference/noise from the received signal.

The estimated SINR values may be ordered from largest to smallest SINRs and the clusters with large SINR values are selected. In one embodiment, the selected clusters have SINR values that are larger than the minimum SINR which still allows a reliable (albeit low-rate) transmission supported by the system. The number of clusters selected may depend on the feedback bandwidth and the request transmission rate. In one embodiment, the subscriber always tries to send the information about as many clusters as possible from which the base station chooses.

The estimated SINR values are also used to choose the appropriate coding/modulation rate for each cluster as discussed above. By using an appropriate SINR indexing scheme, an SINR index may also indicate a particular coding and modulation rate that a subscriber desires to use. Note that even for the same subscribers, different clusters can have different modulation/coding rates.

Pilot symbols serve an additional purpose in determining interference among the cells. Since the pilots of multiple cells are broadcast at the same time, they will interfere with each other (because they occupy the entire frequency band). This collision of pilot symbols may be used to determine the amount of interference as a worst case scenario. Therefore, in one embodiment, the above SINR estimation using this method is conservative in that the measured interference level is the worst-case scenario, assuming that all the interference sources are on. Thus, the structure of pilot symbols is such that it occupies the entire frequency band and causes collisions among different cells for use in detecting the worst case SINR in packet transmission systems.

During data traffic periods, the subscribers can determine the level of interference again. The data traffic periods are used to estimate the intra-cell traffic as well as the inter-cell interference level. Specifically, the power difference during the pilot and traffic periods may be used to sense the (intra-cell) traffic loading and inter-cell interference to select the desirable clusters.

The interference level on certain clusters may be lower, because these clusters may be unused in the neighboring cells. For example, in FIG. 14, in cell A, with respect to cluster A there is less interference because cluster A is unused in cell B (while it is used in cell C). Similarly, in cell A, cluster B will experience lower interference from cell B because cluster B is used in cell B but not in cell C.

The modulation/coding rate based on this estimation is robust to frequent interference changes resulted from bursty packet transmission. This is because the rate prediction is based on the worst case situation in which all interference sources are transmitting.

In one embodiment, a subscriber utilizes the information available from both the pilot symbol periods and the data traffic periods to analyze the presence of both the intra-cell traffic load and inter-cell interference. The goal of the subscriber is to provide an indication to the base station as to those clusters that the subscriber desires to use. Ideally, the result of the selection by the subscriber is clusters with high channel gain, low interference from other cells, and high availability. The subscriber provides feedback information that includes the results, listing desired clusters in order or not as described herein.

Figure 15:
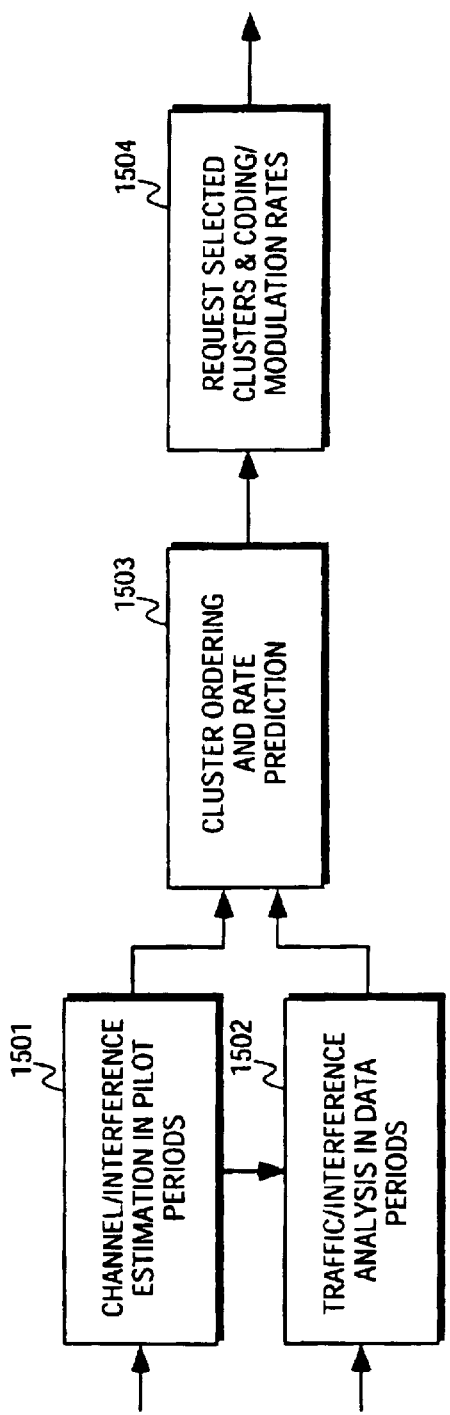
FIG. 15 illustrates subscriber processing.

FIG. 15 illustrates one embodiment of subscriber processing The processing is performed by processing logic that may comprise hardware (e.g., dedicated logic, circuitry, etc.), software (such as that which runs on, for example, a general purpose computer system or dedicated machine), or a combination of both.

Referring to FIG. 15, channel/interference estimation processing block 1501 performs channel and interference estimation in pilot periods in response to pilot symbols. Traffic/interference analysis processing block 1502 performs traffic and interference analysis in data periods in response to signal information and information from channel/interference estimation block 1501.

Cluster ordering and rate prediction processing block 1503 is coupled to outputs of channel/interference estimation processing block 1501 and traffic/interference analysis processing block 1502 to perform cluster ordering and selection along with rate prediction.

The output of cluster ordering processing block 1503 is input to cluster request processing block 1504, which requests clusters and modulation/coding rates. Indications of these selections are sent to the base station. In one embodiment, the SINR on each cluster is reported to the base station through an access channel. The information is used for cluster selection to avoid clusters with heavy intra-cell traffic loading and/or strong interference from other cells. That is, a new subscriber may not be allocated use of a particular cluster if heavy intra-cell traffic loading already exists with respect to that cluster. Also, clusters may not be allocated if the interference is so strong that the SINR only allows for low-rate transmission or no reliable transmission at all.

The channel/interference estimation by processing block 1501 is well-known in the art by monitoring the interference that is generated due to full-bandwidth pilot symbols being simultaneously broadcast in multiple cells. The interface information is forwarded to processing block 1502 which uses the information to solve the following equation:

$$H_i S_i + I_i + n_i = y_i$$

where $S_i$ represents the signal for subcarrier (freq. band) i, $I_i$ is the interference for subcarrier i, $n_i$ is the noise associated with subcarrier i, and $y_i$ is the observation for subcarrier i. In the case of 512 subcarriers, i may range from 0 to 511. The $I_i$ and $n_i$ are not separated and may be considered one quantity. The interference/noise and channel gain $H_i$ are not know. During pilot periods, the signal $S_i$ representing the pilot symbols, and the observation $y_i$ are knowns, thereby allowing determination of the channel gain $H_i$ for the case where there is no interference or noise. Once this is known, it may be plugged back into the equation to determine the interference/noise during data periods since $H_i$, $S_i$ and $y_i$ are all known.

The interference information from processing blocks 1501 and 1502 are used by the subscriber to select desirable clusters. In one embodiment, using processing block 1503, the subscriber orders clusters and also predicts the data rate that would be available using such clusters. The predicted data rate information may be obtained from a look up table with precalculated data rate values. Such a look up table may store the pairs of each SINR and its associated desirable transmission rate. Based on this information, the subscriber selects clusters that it desires to use based on predetermined performance criteria. Using the ordered list of clusters, the subscriber requests the desired clusters along with coding and modulation rates known to the subscriber to achieve desired data rates.

Figure 16:
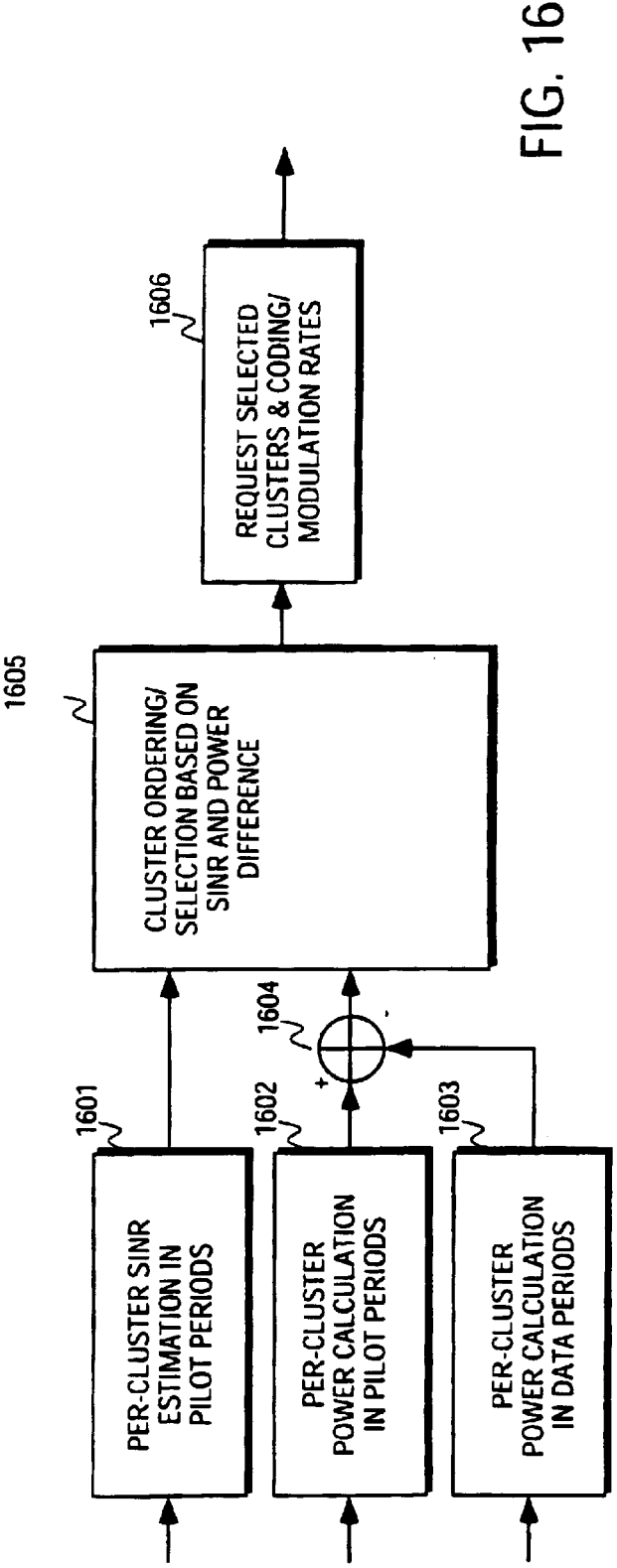
FIG. 16 illustrates one example of FIG. 15.

FIG. 16 is one embodiment of an apparatus for the selection of clusters based on power difference. The approach uses information available during both pilot symbol periods and data traffic periods to perform energy detection. The processing of FIG. 16 may be implemented in hardware, (e.g., dedicated logic, circuitry, etc.), software (such as is run on, for example, a general purpose computer system or dedicated machine), or a combination of both.

Referring to FIG. 16, a subscriber includes SINR estimation processing block 1601 to perform SINR estimation for each cluster in pilot periods, power calculation processing block 1602 to perform power calculations for each cluster in pilot periods, and power calculation processing block 1603 to perform power calculations in data periods for each cluster. Subtractor 1604 subtracts the power calculations for data periods from processing block 1603 from those in pilot periods from processing block 1602. The output of subtractor 1604 is input to power difference ordering (and group selection) processing block 1605 that performs cluster ordering and selection based on SINR and the power difference between pilot periods and data periods. Once the clusters have been selected, the subscriber requests the selected clusters and the coding/modulation rates with processing block 1606.

More specifically, in one embodiment, the signal power of each cluster during the pilot periods is compared with that during the traffic periods, according to the following:

$$P_P = P_S + P_I + P_{N'}$$

$$P_D = \begin{cases} P_N, & \text{with no signal and interference} \\ P_S + P_N, & \text{with signal only} \\ P_I + P_N, & \text{with interference only} \\ P_S + P_I + P_N, & \text{with both signal and interference} \end{cases}$$

$$P_P - P_D = \begin{cases} P_S + P_I, & \text{with no signal and interference} \\ P_I, & \text{with signal only} \\ P_S, & \text{with interference only} \\ 0, & \text{with both signal and interference} \end{cases}$$

where $P_P$ is the measured power corresponding to each cluster during pilot periods, $P_D$ is the measured power during the traffic periods, $P_S$ is the signal power, $P_I$ is the interference power, and $P_N$ is the noise power.

In one embodiment, the subscriber selects clusters with relatively large $P_P/(P_P-P_D)$ (e.g., larger than a threshold such as 10 dB) and avoids clusters with low $P_P/(P_P-P_D)$ (e.g., lower than a threshold such as 10 dB) when possible.

Alternatively, the difference may be based on the energy difference between observed samples during the pilot period and during the data traffic period for each of the subcarriers in a cluster such as the following:

$$\Delta_i = |y_i^P| - |y_i^D|$$

Thus, the subscriber sums the differences for all subcarriers.

Depending on the actual implementation, a subscriber may use the following metric, a combined function of both SINR and $P_P-P_D$, to select the clusters:

$$\beta = f(\text{SINR}, P_P/(P_P-P_D))$$

where f is a function of the two inputs. One example of f is weighted averaging (e.g., equal weights). Alternatively, a subscriber selects a cluster based on its SINR and only uses the power difference $P_P-P_D$ to distinguish clusters with similar SINR. The difference may be smaller than a threshold (e.g., 1 dB).

Both the measurement of SINR and $P_P-P_D$ can be averaged over time to reduce variance and improve accuracy. In one embodiment, a moving-average time window is used that is long enough to average out the statistical abnormity yet short enough to capture the time-varying nature of channel and interference, e.g., 1 millisecond.

Feedback Format for Downlink Cluster Allocation

Figure 17:
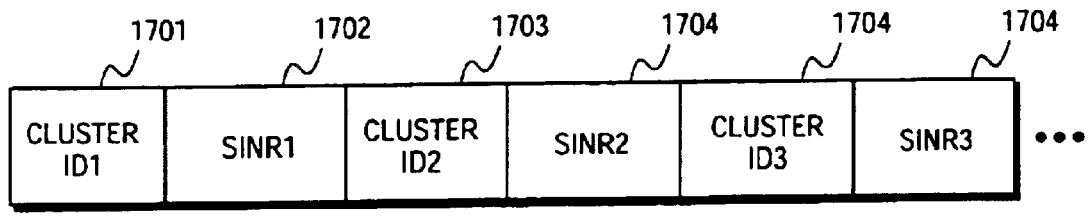
FIG. 17 illustrates one embodiment of a format for arbitrary cluster feedback.

In one embodiment, for the downlink, the feedback contains both the indices of selected clusters and their SINR. An exemplary format for arbitrary cluster feedback is shown in FIG. 17. Referring to FIG. 17, the subscriber provides a cluster index (ID) to indicate the cluster and its associated SINR value. For example, in the feedback, the subscriber provides cluster ID1 (1701) and the SINR for the cluster, SINR1 (1702), cluster ID2 (1703) and the SINR for the cluster, SINR2 (1704), and cluster ID3 (1705), and the SINR for the cluster, SINR3 (1706), etc. The SINR for the cluster may be created using an average of the SINRs of the subcarriers. Thus, multiple arbitrary clusters can be selected as the candidates. As discussed above, the selected clusters can also be ordered in the feedback to indicate priority. In one embodiment, the subscriber may form a priority list of clusters and sends back the SINR information in a descending order of priority.

Typically, an index to the SINR level, instead of the SINR itself is sufficient to indicate the appropriate coding/modulation for the cluster. For example, a 3-bit field can be used for SINR indexing to indicate 8 different rates of adaptive coding/modulation.

An Exemplary Base Station

The base station assigns desirable clusters to the subscriber making the request. In one embodiment, the availability of the cluster for allocation to a subscriber depends on the total traffic load on the cluster. Therefore, the base station selects the clusters not only with high SINR, but also with low traffic load.

Figure 18:
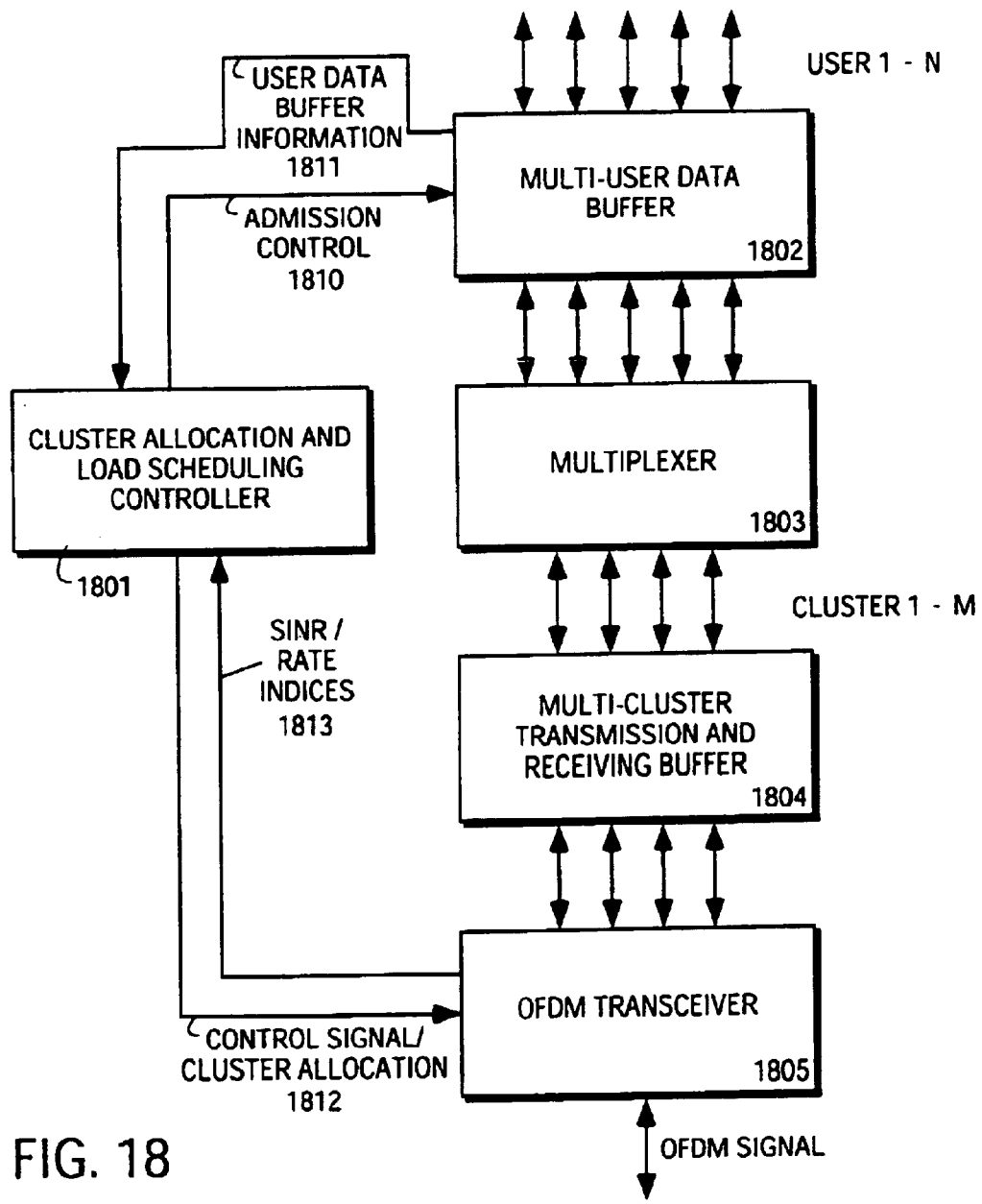
FIG. 18 illustrates one embodiment of a base station.

FIG. 18 is a block diagram of one embodiment of a base station. Referring to FIG. 18, cluster allocation and load scheduling controller 1801 (cluster allocator) collects all the necessary information, including the downlink/uplink SINR of clusters specified for each subscriber (e.g., via SINR/rate indices signals 1813 received from OFDM transceiver 1805) and user data, queue fullness/traffic load (e.g., via user data buffer information 1811 from multi-user data buffer 1802). Using this information, controller 1801 makes the decision on cluster allocation and load scheduling for each user, and stores the decision information in a memory (not shown). Controller 1801 informs the subscribers about the decisions through control signal channels (e.g., control signal/cluster allocation 1812 via OFDM transceiver 1805). Controller 1801 updates the decisions during retraining.

In one embodiment, controller 1801 also performs admission control to user access since it knows the traffic load of the system. This may be performed by controlling user data buffers 1802 using admission control signals 1810.

The packet data of user 1-N are stored in the user data buffers 1802. For downlink, with the control of controller 1801, multiplexer 1803 loads the user data to cluster data buffers (for cluster 1-M) waiting to be transmitted. For the uplink, multiplexer 1803 sends the data in the cluster buffers to the corresponding user buffers. Cluster buffer 1804 stores the signal to be transmitted through OFDM transceiver 1805 (for downlink) and the signal received from transceiver 1805. In one embodiment, each user might occupy multiple clusters and each cluster might be shared by multiple users (in a time-division-multiplexing fashion).

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for communicating with at least one subscriber, the method comprising:
    transmitting orthogonal frequency domain multiplexing (OFDM) signal to the at least one subscriber; and
    receiving direct-sequence spread spectrum (DSSS) signals from the at least one subscriber in response to the OFDM signals.

2. The method defined in claim 1 wherein receiving the DSSS signals comprises receiving multiple code division multiple access (CDMA) signals from a plurality of subscribers.

3. A method for communicating with a base station, the method comprising:
    receiving orthogonal frequency domain multiplexing (OFDM) signals from the base station; and
    transmitting direct-sequence spread spectrum (DSSS) signals to the base station in response to the OFDM signals.

4. The method defined in claim 3 wherein transmitting the DSSS signals comprises transmitting multiple code division multiple access (CDMA) signals from a plurality of subscribers.

5. A system comprising:
    a subscriber having
        a DSSS transmitter,
        an OFDM receiver,
        a first antenna coupled to the DSSS transmitter and the OFDM receiver; and
    a base station communicably coupled with the subscriber, the base station having
        a DSSS receiver,
        an OFDM transmitter,
        a second antenna coup ted to the DSSS receiver and the OFDM transmitter,
    wherein the OFDM receiver of the subscriber is to receive OFDM signals from the OFDM transmitter of the base station, wherein the DSSS transmitter of the subscriber is to transmit DSSS signals to the base station in response to the received OFDM signals, and wherein the DSSS signals are received by the DSSS receiver of the base station.

6. The system defined in claim 5 further comprising:
    a first switch to couple to the DSSS transmitter and the OFDM receiver to the first antenna; and
    a second switch to couple to the DSSS receiver and the OFDM transmitter to the second antenna.

7. The system defined in claim 5 further comprising:
    a first frequency duplexer to couple to the DSSS transmitter and the OFDM receiver to the first antenna; and
    a second frequency duplexer to couple to the DSSS receiver and the OFDM transmitter to the second antenna.

8. The system defined in claim 5 wherein the OFDM transmitter comprises:
    a plurality of processing paths, wherein each of the processing paths has
        a forward error correction (FEC) encoder,
        an interleaver coupled to an output of the FEC encoder, and
        a modulator coupled to an output of the interleaver; and
    an inverse Fast Fourier Transform (IFFT) coupled to receive outputs from modulators in the plurality of processing paths and to output OFDM signals.

9. The system defined in claim 5 wherein the OFDM receiver comprises:
    a Fast Fourier Transform (FFT) unit to perform an FFT on OFDM signals received from the base station;
    a plurality of processing paths coupled to individual outputs of the FFT unit, each of the plurality of processing paths having
        a demodulator coupled to the one of the individual outputs of the FFT unit,
        a deinterleaver coupled to an output of the demodulator, and
        a forward error correction (FEC) decoder coupled to an output of the deinterleaver, the output of the FEC decoder being user data.

10. The system defined in claim 5 wherein the DSSS transmitter and the DSSS receiver comprise a CDMA transmitter and a CDMA receiver, respectively.

11. The system defined in claim 5 wherein the DSSS transmitter comprises:
a forward error correction (FEC) encoder coupled to receive user data;
an interleaver coupled to an output of the FEC encoder;
a modulator coupled to an output of the interleaver; and
a spreader coupled to an output of the modulator.

12. The system defined in claim 5 wherein the DSSS receiver comprises:
a plurality of processing paths, each of the processing paths having
a correlator,
a channel estimator coupled to an output of the correlator, the channel estimator having first and second outputs,
a Rake receiver coupled to an output of the correlator and a first output of the channel estimator,
a de-interleaver coupled to an output of the Rake receiver,
a FEC decoder coupled to an output of the de-interleaver,
a FFT unit coupled to a second output of channel estimator.

13. The system defined in claim 12 wherein the DSSS receiver further comprises a downlink OFDM subcarrier allocator coupled to outputs of FFT units of the plurality of processing paths.

14. The system defined in claim 5 wherein the base station further comprises a DSSS transmitter and the subscriber comprises a DSSS receiver.

15. The system defined in claim 14 wherein the DSSS transmitter comprises a CDMA transmitter and the DSSS receiver comprises a CDMA receiver.

16. The system defined in claim 5 wherein the base station further comprises:
a beacon generator to generate a beacon signal; and
a switch coupled to the beacon generator to combine the beacon signal with OFDM symbols to create a transmission signal for output from the base station.

17. The system defined in claim 16 wherein the beacon signal comprises at least one spread-spectrum pseudo-noise (PN) sequence.

18. The system defined in claim 16 wherein the beacon signal comprises a plurality of spread-spectrum pseudo-noise (PN) sequences.

19. The system defined in claim 18 wherein the subscriber uses a first portion of the plurality of spread-spectrum pseudo-noise (PN) sequences for time synchronization.

20. The system defined in claim 19 wherein the first portion of PN sequence comprises one PN sequence.

21. The system defined in claim 19 wherein the subscriber uses a second portion of PN sequences following the first portion of PN sequences for frequency tracking.

22. The system defined in claim 21 wherein PN sequences in the second portion of PN sequences are shorter than any PN sequences in the first portion of PN sequences.

23. The system defined in claim 5 wherein the CDMA transmitter is for uplink communications.

24. The system defined in claim 23 wherein the OFDM transmitter transmits full bandwidth pilot OFDM symbols during downlink for open loop power control.

25. A communication network comprising:
first and second systems, each of the first and second systems including
a DSSS transmitter,
a DSSS receiver, and
an antenna coupled to the DSSS transmitter and DSSS receiver, wherein the first system comprises an OFDM transmitter coupled to its antenna and the second system comprises an OFDM receiver coupled to its antenna wherein said second system transmits a DSSS signal using said DSSS transmitter in response to an OFDM signal received by said OFDM receiver.

26. The communication network defined in claim 25 wherein the DSSS transmitter and the DSSS receiver comprise a CDMA transmitter and a CDMA receiver, respectively.

27. The communication network defined in claim 25 wherein the DSSS transmitter and DSSS receiver in each of the first and second systems are implemented together as a CDMA transceiver and the OFDM transmitter and the OFDM receiver are each included in separate OFDM transceivers.

28. The communication network defined in claim 25 wherein the OFDM transmitter is for use with downlink transmissions.

29. The communication network defined in claim 25 wherein the OFDM transmitter and the CDMA transmitter in the second system transmit separate downlink transmissions using downlink multiplexing.

30. The communication network defined in claim 25 wherein the downlink multiplexing comprises time division duplexing.

31. The communication network defined in claim 25 wherein the downlink multiplexing comprises frequency division duplexing.

32. The communication network defined in claim 25 wherein the first system comprises a switch coupling the DSSS transmitter, DSSS receiver and the OFDM transmitter to the antenna.

33. The communication network defined in claim 25 wherein the first system comprises a duplexer coupling the DSSS transmitter, DSSS receiver and the OFDM transmitter to the antenna.

34. The communication network defined in claim 25 wherein the second system comprises a switch coupling the DSSS transmitter, DSSS receiver and the OFDM receiver to the antenna.

35. The communication network defined in claim 25 wherein the second system comprises a duplexer coupling the DSSS transmitter, DSSS receiver and the OFDM receiver to the antenna.

36. The communication network defined in claim 25 wherein the OFDM transmitter is for downlink transmissions between the first system and the second system and the DSSS transmitter of the second system is for uplink transmissions from the second system to the first system, and further wherein the first and second systems use frequency division duplexing (FDD) to coordinate downlink and uplink transmissions.

37. The communication network defined in claim 25 wherein the OFDM transmitter is for downlink transmissions between the first system and the second system and the DSSS transmitter of the second system is for uplink transmissions from the second system to the first system, and further wherein the first and second systems use time division duplexing (TDD) to coordinate downlink and uplink transmissions.

38. The communication network defined in claim 25 further comprising a third system having a DSSS transmitter and an OFDM receiver.

39. The communication method defined in claim 25 further comprising a fourth system having a DSSS transceiver.

40. The communication method defined in claim 25 wherein the first system further comprises an OFDM subcarrier allocator coupled to the OFDM transmitter, the OFDM subcarrier allocator to adaptively allocate subcarriers to the second system according to the signal-to-noise (SNR) ratio information of each subcarrier associated with each of the second systems.

41. The communication network defined in claim 40 wherein the SNR information is measured by the first and second systems and fed back to the OFDM subcarrier allocator.

42. The communication network defined in claim 40 wherein the SNR information is directly measured at the first system using an uplink DSSS signal of each of the second system.

43. The communication network defined in claim 40 wherein the DSSS receiver of the first system further comprises a Rake receiver and a channel estimator coupled to provide a channel estimate to the Rake receiver, the channel estimator to send the channel estimate to the OFDM subcarrier allocator for adaptive channel allocation.

44. The communication network defined in claim 43 wherein the channel estimator uses training sequences to generate the channel estimate.

45. The communication network defined in claim 43 wherein the channel estimator generates the channel estimate without training sequences.

46. The system defined in claim 25 wherein the second system further comprises:
   a beacon generator to generate a beacon signal; and
   a switch coupled to the beacon generator to combine the beacon signal with OFDM symbols to create a transmission signal for output from the second system.

47. The system defined in claim 46 wherein the beacon signal comprises at least one spread-spectrum pseudo-noise (PN) sequence.

48. The system defined in claim 46 wherein the beacon signal comprises a plurality of spread-spectrum pseudo-noise (PN) sequences.

49. The system defined in claim 48 wherein the subscriber uses a first portion of the plurality of spread-spectrum pseudo-noise (PN) sequences for time synchronization.

50. The system defined in claim 49 wherein the first portion of PN sequence comprises one PN sequence.

51. The system defined in claim 49 wherein the subscriber uses a second portion of PN sequences following the first portion of PN sequences for frequency tracking.

52. The system defined in claim 51 wherein PN sequences in the second portion of PN sequences are shorter than any PN sequences in the first portion of PN sequences.

53. The system defined in claim 25 wherein the CDMA transmitter is for uplink communications.

54. The system defined in claim 53 wherein the OFDM transmitter transmits full bandwidth pilot OFDM symbols during downlink for open loop power control.

* * * * *

UNITED STATES PATENT AND TRADEMARK OFFICE
CERTIFICATE OF CORRECTION

PATENT NO. : 6,940,827 B2  Page 1 of 1
APPLICATION NO. : 09/802453
DATED : September 6, 2005
INVENTOR(S) : Xiaodong Li et al.

It is certified that error appears in the above-identified patent and that said Letters Patent is hereby corrected as shown below:

Column 18, Claim 5, Line 18, delete the portion of text reading "coup ted" and replace with --coupled--.

Signed and Sealed this

Eleventh Day of May, 2010

David J. Kappos
*Director of the United States Patent and Trademark Office*